J. WAHL.
GREASE RETAINER.
APPLICATION FILED OCT. 21, 1916.

1,223,453.

Patented Apr. 24, 1917.

Inventor
JOHN WAHL.
By Watson E. Coleman
Attorney

UNITED STATES PATENT OFFICE.

JOHN WAHL, OF ALPENA, SOUTH DAKOTA.

GREASE-RETAINER.

1,223,453.

Specification of Letters Patent. Patented Apr. 24, 1917.

Application filed October 21, 1916. Serial No. 127,030.

*To all whom it may concern:*

Be it known that I, JOHN WAHL, a citizen of the United States, residing at Alpena, in the county of Jerauld and State of South Dakota, have invented certain new and useful Improvements in Grease-Retainers, of which the following is a specification, reference being had to the accompanying drawings.

This invention relates to certain improvements in grease retainers and has relation more particularly to a device of this general character especially designed and adapted for use in connection with automobiles; and it is an object of the invention to provide a novel and improved grease retainer which can be readily and conveniently applied to the rear axle of an automobile and which, when in applied position, serves effectively to prevent the grease from leaking.

The invention consists in the details of construction and in the combination and arrangement of the several parts of my improved grease retainer whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view partly in elevation and partly in section illustrating a grease retainer constructed in accordance with an embodiment of my invention and in applied position;

Fig. 2 is a view in elevation of the inner face of the cap comprised in my improved retainer with the packing applied therein; and Fig. 3 is an elevational view of the annular member or ring embodied in my invention as herein disclosed.

As set forth in the accompanying drawings, C denotes a rear casing of a type generally employed in connection with automobiles and through which is disposed the axle A, the spindle of which being illustrated in fragment in Fig. 1.

S denotes bearing sleeves of a conventional type which extend beyond the end of the casing C and with the periphery of the outer sleeve is adapted to be frictionally engaged the flange 1 of the cap 2. The cap 2 is provided at substantially its axial center with the opening 3 through which the axle A or more particularly the spindle thereof is adapted to be directed.

Snugly fitting within the cap 2 is the washer 4 of absorbent material and which snugly or tightly surrounds the axle A, as illustrated in Fig. 1, and imposed upon the washer 4 and snugly fitting within the cap 2 is a metallic or substantially rigid washer 5. Imposed upon the washer 5 is a second absorbent washer 6 of a diameter less than the diameter of the washer 5 and which is adapted to extend within the inner sleeve S and bear upon the outer retainer R for the bearings B.

A third absorbent washer 7 is imposed upon the washer 5 intermediate the flange 1 and the periphery of the washer 6 and which is adapted to contact with the outer ends of the sleeves S as particularly illustrated in Fig. 1, whereby the possibility of grease leaking out from the axle A or from within the sleeves S is effectively prevented.

The outer marginal portion of the flange 1 of the cap 2 is outwardly flared, as at 8, and adapted to frictionally engage the annular member 9. The member 9 is provided at its inner marginal portion with the inwardly directed annular flange 10 adapted to frictionally engage the periphery of the outer sleeve S and in applying my improved retainer in operative position the annular member 9 is placed in position before the cap 2 is applied.

From the foregoing description, it is thought to be obvious that a retainer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A grease retainer consisting of a flanged cap provided with a central opening, a washer of absorbent material positioned within said cap, a second washer of absorbent material arranged within said cap and of a diameter less than the diameter of the first named washer, a third washer of absorbent material positioned intermediate the periphery of the second named washer and the flange of the cap, and a washer of substantially rigid material fitting within the cap and interposed between the first named washer and the last two named washers.

2. A grease retainer consisting of a flanged cap provided with a central opening, a washer of absorbent material positioned within said cap, a second washer of absorbent material arranged within said cap and of a diameter less than the diameter of the first named washer, a third washer of absorbent material positioned intermediate the periphery of the second named washer and the flange of the cap, and a washer of substantially rigid material fitting within the cap and interposed between the first named washer and the last two named washers, said substantially rigid washer fitting snugly within the cap.

3. A grease retainer comprising, in combination, a flanged cap, the outer marginal portion of the flange being outwardly flared, absorbent material within the cap, and an annular member adapted to surround the free marginal portion of the flange of the cap, said annular member being provided at its marginal portion remote from the cap with an inturned annular flange.

In testimony whereof I hereunto affix my signature in the presence of two witnesses.

JOHN WAHL.

Witnesses:
M. A. MANWARING,
E. F. McKILLIPS.